Figure 1:
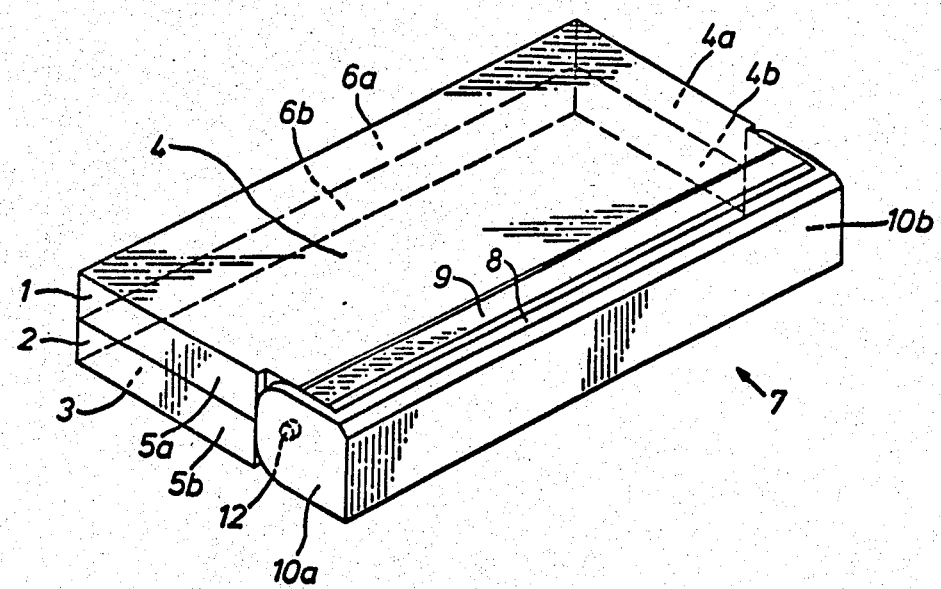

United States Patent [19]

Pertzsch et al.

[11] Patent Number: 4,527,691
[45] Date of Patent: Jul. 9, 1985

[54] MAGNETIC TAPE CASSETTE

[75] Inventors: Albert Pertzsch; August Liepold, both of Munich; Hubert Brunner, Weil; Ludwig Zeroni, Ottobrunn, all of Fed. Rep. of Germany

[73] Assignee: Agfa-Gevaert Aktiengesellschaft, Leverkusen, Fed. Rep. of Germany

[21] Appl. No.: 641,596

[22] Filed: Aug. 17, 1984

[30] Foreign Application Priority Data

Aug. 30, 1983 [DE] Fed. Rep. of Germany ....... 3331160

[51] Int. Cl.³ ........................................... B65D 85/672
[52] U.S. Cl. .................................... 206/387; 220/334
[58] Field of Search ................. 206/387; 220/334, 341

[56] References Cited

U.S. PATENT DOCUMENTS

| 1,283,749 | 11/1918 | Haver | 220/334 |
| 1,452,391 | 4/1923 | Rupert | 220/334 |
| 1,755,063 | 4/1930 | Holden | 220/334 |
| 3,809,219 | 5/1974 | Esashi | 220/334 |
| 4,365,712 | 12/1982 | Oishi et al. | 206/387 |

FOREIGN PATENT DOCUMENTS

| 34756 | 2/1980 | European Pat. Off. | 206/387 |
| 130257 | 8/1982 | Japan | 206/387 |
| 210489 | 12/1982 | Japan | 206/387 |

Primary Examiner—Joseph Man-Fu Moy
Attorney, Agent, or Firm—Connolly and Hutz

[57] ABSTRACT

Magnetic tape cassette for magnetic recording and playback devices, comprising a substantially rectangular, two-part housing which has an upper main wall and an opening along its front side, along which the magnetic tape is transported from two plane-parallel positioned reels, and a pivotal front lid which partly overlaps the side walls and which release and closes the opening, and which comprises an outer cover and an inner cover by which the magnetic tape is enclosed in the closed position of the front lid being biassed by means of torsion springs, one of the pivot pins 12 on the inside wall of the side part 10a of the front lid 7 accomodating a one-armed flat spiral spring 13, the arm 16 of which, pointing towards the front lid, has a length which extends up to the outer cover 8 of the front lid, and the arm in the ready made cassette lies in a groove 18 on the front end of the upper part of the cassette. This construction ensures reliably transportable and simple mounting of the front lid and housing during assembly of the cassette and avoids the danger of the front lid being blocked in pivoting on account of the limited space between front lid and front end of the upper cassette part.

2 Claims, 3 Drawing Figures

MAGNETIC TAPE CASSETTE

This invention relates to a magnetic tape cassette comprising a substantially rectangular, two-part housing which has upper and lower parallel main walls, each with three side walls, and an opening along the front of the housing, along which the tape passes from two plane-parallel positioned reels, and a pivotally mounted front lid which releases or closes the opening and comprises an outer cover and an inner cover, by which the tape is enclosed when the front lid is in its closed position. The cassette is suitable for magnetic recording and play-back devices, for example for video tape recorders.

Tape cassettes known hitherto for video recorders have on the front an open tape guidance system with a recessed region located behind, in the lower part of the cassette. When the cassette is introduced into the opening of a video recorder, the tape guiding member is introduced into this region and the tape is guided out of the cassette on a specific path. For external protection, these cassettes have a pivotal front lid which partly or completely covers the front of the cassette. However, during operation, due to the recesses, the cassettes are not protected against dust, so that dust may settle on the tapes which results in so-called signal interruptions. Although in a more recent type of tape cassette the recess is still in the lower part of the cassette when loading the cassette into the video recorder, the tape, when out of operation, is protected by a front lid comprising an inner and outer cover between which the tape is firmly held in the closed position of the lid. Consequently, dust is prevented from adhering to the tape and the tape is also prevented from being damaged. A cassette of this type and the front lid mechanism thereof are described in, for example, DE-OS Nos. 3,223,279 and 3,302,392. The front lid is attached and made to pivot in the vertical direction by means of two holes, in the left-hand and right-hand end parts of the side walls of the lower part of the cassette, in which two pins on the side walls of the front lid engage. A torsion spring positioned on one side or on both sides of the above-mentioned pins is used to move the front lid in a vertical direction or to press it in an anti-clockwise direction. One end of the spring may rest on a peg in the side wall of the front lid, while the other end strikes against a projection of the side wall of the upper part of the cassette (FIGS. 4 and 5 of DE-OS No. 3,302,392). The mounting of the front lid and of the upper part of the cassette with a torsion spring of this type is relatively difficult and necessitates complicated pre-assembly devices in order to secure the one loose end of the torsion spring firmly to the side wall and to clamp the other end into the upper part of the cassette in the correct direction.

Thus, an object of the present invention is to design the suspension of the torsion spring in order to move the front lid vertically, in the case of a tape cassette of the initially described type, such that a reliably transportable and simple mounting is guaranteed during assembly of the cassette.

This object is achieved according to the present invention by a magnetic tape cassette for magnetic recording and play-back devices, which comprises a substantially rectangular two-part housing which has an upper main wall and a lower main wall, each with three side walls, and an opening along its front side, along which the magetic tape is transported from two plane-parallel-positioned reels, and a pivotal front lid which partly overlaps the side walls, and which releases and closes the opening, and which comprises an outer cover and an inner cover, by which the tape is enclosed when the front lid is in its closed position, the front lid being biassed by means of torsion springs, one of the pivot pins on the inside wall of the side part of the front lid accomodating a one-armed lid spiral spring, the arm of which pointing towards the front lid having a length which extends up to the outer cover of the lid, and the arm in the ready-made cassette rests in a groove on the front end of the upper part of the cassette.

The present invention will now be described in more detail with reference to the accompanying drawings.

Figure 2:
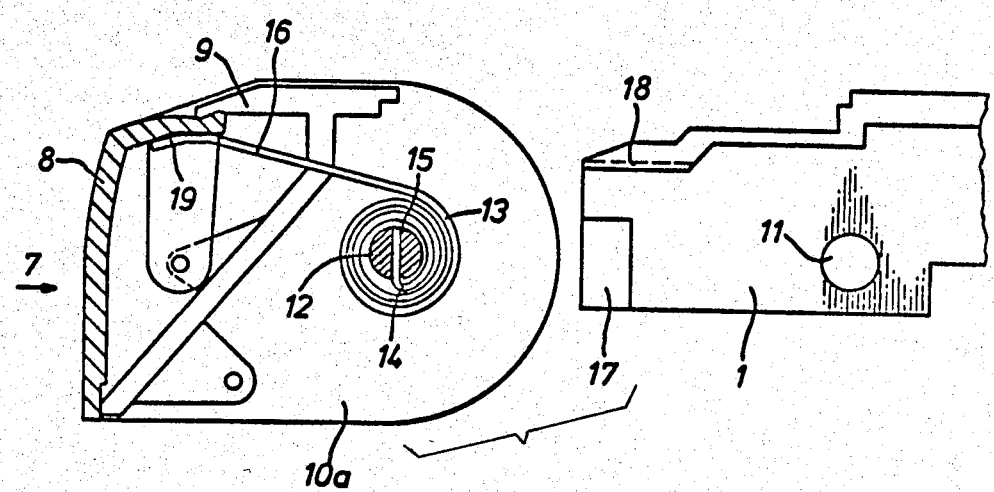
Figure 3:
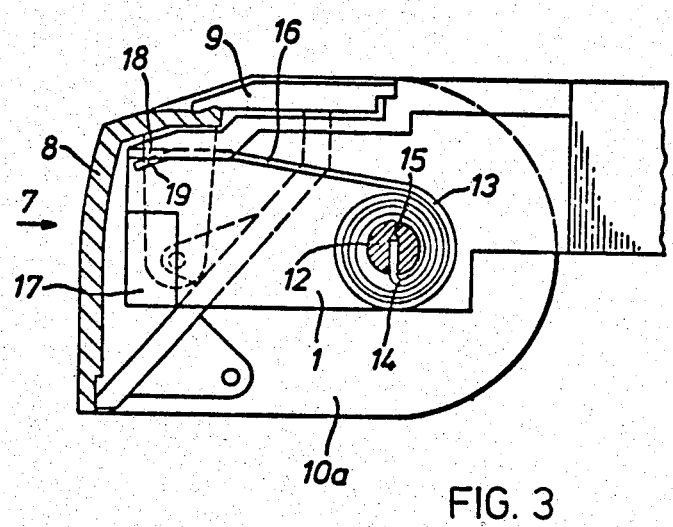

FIG. 1 shows a perspective view of a magnetic tape cassette having a front lid, comprising an inner cover and an outer cover, FIG. 2 shows a section through the outer cover of the front lid with a flat spiral spring and the front end of the upper part of the cassette in an unassembled condition, and FIG. 3 shows a section corresponding to FIG. 2 in the assembled condition of the front lid and the upper part of the cassette.

FIG. 1 shows a magnetic tape cassette of the initially described type comprising an upper part 1 and a lower part 2 with an upper main wall 4 and a lower main wall 3, each with three side walls 4a, 4b, 5a, 5b, 6a, 6b. Two plane-parallel positioned tape reels are located in the cassette, as is also known for other types of cassette, between which the magnetic tape passes along the front of the cassette housing and is wound and unwound. The arrangement of the tape reels and of the magnetic tape in the cassette is shown in detail in FIGS. 5 and 6 of DE-OS No. 3,223,279. The front of the cassette includes a front lid 7 having an outer cover 8 and an inner cover 9 (FIG. 2) and side parts 10a, 10b which partly overlap the side walls of the cassette housing. When the front lid is closed, the magnetic tape is sealed in between the two covers and is thus protected from possible damage. In the front left-hand and right-hand sections of the upper part of the cassette, as shown in FIG. 2 and FIG. 3 there are two holes 11 and, on the insides of each of the left-hand and right-hand side parts of the front lid there is a pivot pin 12. The pins 12 are mounted in the holes 11 and thus make it possible for the front lid to pivot. In order to obtain a suitable bias of the front cover, the tension springs are required. According to the present invention, a tension spring of this type comprises a one-armed flat spiral spring 13 which sits on at least one of the pivot pins 12. This spring is attached on a particularly simple manner by bending round the inner end 14 of the spring and introducing it into a slit 15 in the swivel pin. The bracket arm 16 of the spiral spring runs along the inside of the side part of the front lid up to the inside of the outer cover. For the assembly of the individual parts of the cassette, the front lid and the upper part of the cassette are brought together and then the lower part of the cassette is positioned thereon. In order for the pivot pins 12 to easily engage in the holes 11, guiding bevel 17 is provided on the front edges of the upper part of the cassette. This bevel 17 ensures a reliable and simple snap-fit of the pivot pins. In this condition, the flat-spiral spring is automatically positioned in a groove 18 on the outside of the upper part of the cassette and it ensures the bias of the outer cover in the closed position. The end 19 of the spiral spring arm may be slightly bent up so that any burrs which may be present do not result in the spiral springs being hooked inside the groove. When the front lid and the upper part of the cassette are brought together, no additional assembly aids are required for guiding and firmly securing the spiral spring. It must be stressed that the front lid with the spiral spring on the one hand and the upper part of the cassette on the other hand simply have to be inserted one inside the other in a vertically correct position until the swivel pins catch into the holes. The operation of inserting these two parts one inside the other may be carried out in a particularly simple manner if it is effected in the back position of the front lid and of the upper part of the cassette. Moreover, the flat spiral spring which is designed according to the present invention has the advantage of a smaller installation height than conventional helical springs. In the small space between the side part of the front lid and the opposite section of the upper part of the cassette, when the front lid is pivoted, there is always the danger of the spring being blocked on the contacting parts of the front lid and of the upper part of the cassette, even if its overall height is only slightly different. The overall height of a cylindrical helical spring is much greater than that of flat spiral spring the turns of which lie, as is known, in a single plane. When a spiral spring is used, swivelling the front lid does not present any problems, and a simple construction of the magnetic tape cassette may be provided, and a reliably transportable and simple assembly thereof may be achieved by means of the spiral spring according to the present invention.

We claim:

1. A magnetic tape cassette for magnetic recording and play-back devices, comprising a substantially rectangular, two-part housing which has an upper main wall and a lower main wall, each with three side walls, and an opening along its front side, along which the magnetic tape is transported from two plane-parallel positioned reels, and a pivotal front lid which partly overlaps the side walls and which releases and closes the opening, and which comprises an outer cover and an inner cover, by which the magnetic tape is enclosed in the closed position of the front lid, the lid being biassed by means of torsion springs, characterised in that one of the pivot pins 12 on the inside wall of the side part 10a of the front flap 7 accomodates a one-armed lid spiral spring 13, the arm 16 of which, pointing towards the front lid, has a length which extends up to the outer cover 8 of the front lid, and the arm in the ready-made cassette lies in a groove 18 on the front end of the upper part of the cassette.

2. A magnetic tape cassette according to claim 1, characterised in that the flat spiral spring 13 is secured in a slit 15 of the pivot pin, and the inner end 14 of the spring is bent round and may be inserted into the slit.

* * * * *